United States Patent
Hakola et al.

(10) Patent No.: US 9,133,580 B2
(45) Date of Patent: Sep. 15, 2015

(54) METHOD FOR MODERNIZING A MULTIROLL CALENDER, IN PARTICULAR FOR MODERNIZING A SUPERCALENDER AND A MODERNIZED MULTIROLL CALENDER, IN PARTICULAR A MODERNIZED SUPERCALENDER

(71) Applicants: Jani Hakola, Nummenkylä (FI); Lauri Aaltio, Järvenpää (FI); Mika Viljanmaa, Helsinki (FI); Pekka Linnonmaa, Helsinki (FI); Laura Savela, Helsinki (FI); Arto Kumpulainen, Kellokoski (FI); Petri Ristola, Kerava (FI)

(72) Inventors: Jani Hakola, Nummenkylä (FI); Lauri Aaltio, Järvenpää (FI); Mika Viljanmaa, Helsinki (FI); Pekka Linnonmaa, Helsinki (FI); Laura Savela, Helsinki (FI); Arto Kumpulainen, Kellokoski (FI); Petri Ristola, Kerava (FI)

(73) Assignee: Valmet Technologies, Inc., Espoo (FI)

( * ) Notice: Subject to any disclaimer, the term of this patent is extended or adjusted under 35 U.S.C. 154(b) by 241 days.

(21) Appl. No.: 13/773,323

(22) Filed: Feb. 21, 2013

(65) Prior Publication Data
US 2013/0231230 A1    Sep. 5, 2013

(30) Foreign Application Priority Data
Mar. 2, 2012    (EP) .................................... 12157852

(51) Int. Cl.
*D21G 1/02*     (2006.01)
*B23P 6/00*     (2006.01)
*D21G 1/00*     (2006.01)

(52) U.S. Cl.
CPC ............... *D21G 1/0266* (2013.01); *B23P 6/00* (2013.01); *D21G 1/008* (2013.01); *D21G 1/0253* (2013.01); *Y10T 29/4973* (2015.01); *Y10T 29/49716* (2015.01)

(58) Field of Classification Search
CPC ................ B23P 6/00; Y10T 29/49716; Y10T 29/49773; Y10T 29/49718; Y10T 29/49545
See application file for complete search history.

(56) References Cited

U.S. PATENT DOCUMENTS

| | | | |
|---|---|---|---|
| 5,438,920 A | 8/1995 | Koivukunnas et al. | |
| 2005/0178278 A1* | 8/2005 | Hinz et al. | 100/38 |
| 2006/0042479 A1* | 3/2006 | Kyytsonen et al. | 100/161 |

FOREIGN PATENT DOCUMENTS

| | | |
|---|---|---|
| CN | 101838951 A | 9/2010 |
| EP | 12157852 | 3/2012 |
| FI | 1935214 A | 6/1995 |

(Continued)

OTHER PUBLICATIONS

European Search Report for EP12157852 dated Jul. 18, 2012.

*Primary Examiner* — Christopher Besler
(74) *Attorney, Agent, or Firm* — Stiennon & Stiennon

(57) ABSTRACT

A method for modernizing a existing multiroll calender, having at least one stack of calender rolls (10, 20), each stack comprising at least two calender rolls (11, 12, 13, 14, 21, 22, 23, 24) and at least one of the calender rolls being a smooth-surfaced press-roll (12, 22). In an existing multiroll calender the smooth-surfaced press roll (12, 22) is replaced by an ultra thermo roll that is a thermo roll with a diameter substantially the same or less than the thermo roll to be replaced, so that the surface temperature of the ultra thermo roll when heated is at least 110° C., and has at least 10° C. higher than the surface temperature of the existing roll with the same heating fluid temperature and having flow channels arranged in such a way that vibration excitation is minimized, by being arranged to form a spiral geometry in the mantle.

10 Claims, 3 Drawing Sheets

(56) References Cited

FOREIGN PATENT DOCUMENTS

| WO | 9919565 | A1 | 4/1999 |
| WO | 2004061222 | A1 | 7/2004 |
| WO | 2006108924 | A1 | 10/2006 |
| WO | 2009077647 | A1 | 6/2009 |

* cited by examiner

METHOD FOR MODERNIZING A MULTIROLL CALENDER, IN PARTICULAR FOR MODERNIZING A SUPERCALENDER AND A MODERNIZED MULTIROLL CALENDER, IN PARTICULAR A MODERNIZED SUPERCALENDER

CROSS REFERENCES TO RELATED APPLICATIONS

This application claims priority on European Application No. EP12157852, filed Mar. 2, 2012, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

In general the present invention relates to calenders for fiber web in a fiber web machine. More especially the present invention relates to a method for modernizing a multiroll calender for a fiber web in which at least one of the calender rolls is a smooth-surfaced press-roll.

Calendering is generally carried out in order to improve the properties, like smoothness and gloss, of a web-like material such as a paper or board web. In calendering the web is passed into a calendering nip formed between rolls that are pressed against each other, in which nip the web becomes deformed as by the action of temperature, moisture and nip pressure. In the calender the nips are formed between a smooth-surfaced press roll such as a metal roll and a roll coated with resilient material such as a polymer roll. The resilient surfaced roll adjusts itself to the forms of the web surface and presses the opposite side of the web evenly against the smooth-surfaced press roll. Multinip or multiroll calendering is calendering in a calendering unit in which the nips are formed between a smooth-surfaced press roll such as a metal roll and a roll coated with resilient material such as a polymer roll and the linear load increases in multinip calenders from the upper nip to the lower nip due to gravitation, unless roll relief systems are used.

From the prior art multiroll calenders are known in which a set of rolls formed of two stacks of rolls, with each stack of rolls comprising at least two calender rolls. Multinip or multiroll calender are known for example by the brand names OptiLoad® and TwinLine™. In F1 patent 96334 is disclosed a method for calendering a paper or an equivalent web material in a calender where the web to be calendered is passed through nips formed by a deflection-compensated upper roll and a deflection-compensated lower roll, and by two or more intermediate rolls arranged between the upper and lower roll. The rolls are arranged as a substantially vertical stack of rolls. Supercalenders are multiroll calenders composed of alternating hard and soft rolls, which soft rolls are filled rolls that have a steel shaft around which a multiplicity of specialty paper sheets with a hole in the middle are slid. The paper sheets are then compressed with a hydraulic press. The most common number of rolls is 9-12, but here can be up to 16 rolls.

In publication F1 20095284 is disclosed a heatable and/or coolable roll for fiber web machines which comprises a mantle part and end pieces attached to the ends of the mantle part for arranging a feed channel and a discharge channel for a heat transfer medium in the roll. The mantle part comprises flow channels for the heat transfer medium. The mantle part of the roll comprises an inner layer and an outer layer attached on the inner layer and the flow channels for heat transfer medium comprise flow grooves formed on the outer surface of the inner layer, and the roll comprises at its first end a first circumferential flow chamber, which is in flow connection with the feed channel or the discharge channel for the heat transfer medium of the roll, wherein the roll comprises first flow bushings, which are arranged in connection with the first flow chamber such that by each first flow bushing is formed a flow connection for the heat transfer medium between the first circumferential flow chamber and the flow channel of the mantle part. Flow channels can be arranged to form a spiral shaped geometry in the mantle, thus minimizing vibration excitation from uneven thermal expansion from fluid channels.

As fiber web machine running speeds increase the need for increasing calendering capacity increases. Also the need for increasing capacity of existing calenders increases since in many prior art fiber web machines the calender, in particular the supercalender, has become the part of the fiber web production line that limits the available capacity and hinders the production of full capacity of the other parts of the fiber web production line. Due to this, in many cases two or even three supercalenders are needed for calendering the production of the fiber web production line.

The line between paper and board is flexible and paper and board are available in a wide variety of grades and can be divided according to basis weight into two categories: papers with a single ply and a basis weight of 25-300 $g/m^2$ and boards manufactured in multi-ply technology and having a basis weight of 150-600 $g/m^2$. It should be noted that the border line between paper and board is flexible since board grades with lightest basis weights are lighter than the heaviest paper grades. Generally speaking, paper is used for printing and board for packaging.

The subsequent descriptions are examples of some values presently applied for fibrous webs, and there may be considerable variations from the disclosed values. The descriptions are mainly based on the source publication *Papermaking Science and Technology*, section Papermaking Part 3, edited by Jokio, M., published by Fapet Oy, Jyvaskyla 1999, page 362.

Mechanical-pulp based, i.e. wood-containing printing papers include newsprint, uncoated magazine and coated magazine paper.

Newsprint is composed either completely of mechanical pulp or may contain some bleached softwood pulp (0-15%) and/or recycled fiber to replace some of the mechanical pulp. General values for newsprint can be regarded as follows: basis weight 40-48.8 $g/m^2$, ash content (SCAN-P 5:63) 0-20%, PPS s10 roughness (SCAN-P 76:95) 3.0-4.5 pm, Bendtsen roughness (SCAN-P 21:67) 100-200 ml/min, density 200-750 $kg/m^3$, brightness (ISO 2470:1999) 57-63%, and opacity (ISO 2470:1998) 90-96%.

Uncoated magazine paper (SC=supercalendered) usually contains mechanical pulp to 50-70%, bleached softwood pulp to 10-25%, and fillers to 15-30%. Typical values for calendered SC paper (containing e.g. SC-C, SC-B. SC-NM-) include basis weight 40-60 $g/m^2$, ash content (SCAN-P 5:63) 0-35%, Hunter gloss (ISO/DIS 8254/1)<20-50%, PPS s10 roughness (SCAN-P 76:95) 1.2-2.5 pm, Bendtsen roughness (SCAN-P 21:67) 100-200 ml/min, density 700-1250 $kg/m^3$, brightness (ISO 2470:1999) 62-70%, and opacity (ISO 2470: 1998) 90-95%.

Coated magazine paper (LWC=light weight coated) contains mechanical pulp to 40-60%, bleached softwood pulp to 25-40%, and fillers and coaters to 20-35%. General values for LWC paper can be regarded as follows: basis weight 40-70 g/m$^2$, Hunter gloss 50-65%, PPS s10 roughness 0.8-1.5 pm (offset), 0.6-1.0 pm (roto), density 1100-1250 kg/m$^3$, brightness 70-75%, and opacity 89-94%.

General values for MFC (machine finished coated) can be regarded as follows: basis weight 50-70 g/m$^2$, Hunter gloss 25-70%, PPS s10 roughness 2.2-2.8 pm, density 900-950 kg/m$^3$, brightness 70-75%, and opacity 91-95%.

General values for FCO (film coated offset) can be regarded as follows: basis weight 40-70 g/m$^2$, Hunter gloss 45-55%, PPS s10 roughness 1.5-2.0 pm, density 1000-1050 kg/m$^3$, brightness 70-75%, and opacity 91-95%.

General values for MWC (medium weight coated) can be regarded as follows: basis weight 70-90 g/m$^3$, Hunter gloss 65-75%, PPS s10 roughness 0.6-1.0 pm, density 1150-1250 kg/m$^3$, brightness 70-75%, and opacity 89-94%.

HWC (heavy weight coated) has a basis weight of 100-135 g/m$^2$ and can be coated even more than twice.

Pulp-produced, wood free printing papers or fine papers include uncoated—and coated—pulp-based printing papers, in which the portion of mechanical pulp is less than 10%.

Uncoated pulp-based printing papers (WFU) contain bleached birchwood pulp to 55-80%, bleached softwood pulp 0-30%, and fillers to 10-30%. The values with WFU have a large variation: basis weight 50-90 g/m$^2$, Bendtsen roughness 250-400 ml/min, brightness 86-92%, and opacity 83-98%.

In coated pulp-based printing papers (WFC), the amounts of coating vary widely in accordance with requirements and intended application. The following are typical values for once and twice-coated, pulp-based printing paper: once-coated basis weight 90 g/m$^2$, Hunter gloss 65-80%, PPS s10 roughness 0.75-2.2 pm, brightness 80-88%, and opacity 91-94%, and twice-coated basis weight 130 g/m$^2$, Hunter gloss 70-80%, PPS s10 roughness 0.65-0.95 pm, brightness 83-90%, and opacity 95-97%.

Release papers have a basis weight within the range of 25-150 g/m$^2$.

Other papers include e.g. sackkraft papers, tissues, and wallpaper bases.

Board making makes use of chemical pulp, mechanical pulp and/or recycled pulp. Boards can be divided e.g. in the following main groups according to applications thereof: Corrugated board, comprising a liner and fluting; Boxboards, used for making boxes, cases, which boxboards include e.g. liquid packaging boards (FBB=folding boxboard, LPB=liquid packaging board, WLC=white-lined chipboard, SBS=solid bleached sulfite, SUS=solid unbleached sulfite); Graphic boards, used for making e.g. cards, files, folders, cases, covers, etc. and wallpaper bases.

An object of the present invention is to create a method for modernizing a multiroll calender and a modernized multiroll calender in which high capacity of the production line is achieved.

Another object of the present invention is to achieve a method and a multiroll calender in which possible disadvantages and problems of known methods and calenders are eliminated or at least minimized.

SUMMARY OF THE INVENTION

To achieve the objects mentioned above the method according to the invention is to replace in an existing multiroll calender at least one smooth-surfaced press-roll with an ultra thermo roll.

The multiroll calender according to the invention is an existing multiroll calender in which at least one smooth-surfaced press-roll has been replaced with an ultra thermo roll.

According to the invention a method and a multiroll calender is provided in which for modernization of an existing multiroll calender at least one smooth-surfaced press-roll is replaced by an ultra thermo roll that is a thermo roll having:
 a diameter which is substantially the same or less than the diameter of the thermo roll to be replaced
 a surface temperature when heated of at least 110° C.
 wherein the surface temperature is at least 10° C. higher than the surface temperature of rolls of the prior art with the same heating fluid temperature
 flow channels arranged in such a way that the vibration excitation is minimized wherein the flow channels are advantageously arranged to form spiral shaped geometry in the mantle of the thermo roll.

According to an advantageous feature of the invention in the method in a multi-roll calender and a multiroll calender is provided in which at least one smooth-surfaced press-roll is replaced by an ultra thermo roll, that is a thermo roll with a mantle part that comprises an inner layer and an outer layer attached on the inner layer and flow channels for heat transfer medium comprise at least flow grooves formed on the outer surface of the inner layer.

According to an advantageous feature of the invention the distance of the flow grooves from the outer surface of the outer layer of the mantle part of the ultra thermo roll is less than 45 mm.

According to an advantageous feature of the invention the flow grooves of the ultra thermo roll extend in spiral path in the axial direction of the ultra thermo roll.

According to an advantageous feature of the invention heat transfer coefficient from fluid to surface is higher than 800 W/(m$^{2\circ}$ C.)

The extreme combination of properties of the ultra thermo roll comprises advantageously at least two properties selected from the group of properties consisting of:
 surface temperature of the thermo roll which is at least 110° C.
 surface roughness of the thermo roll which is less than 0.20 μm Ra
 heat transfer coefficient of the thermo roll which is at least 800 W/(m$^{2\circ}$ C.)
 a distance of the flow grooves from the outer surface of the outer layer of the mantle part of the ultra thermo roll which is less than 45 mm
 flow grooves which extend in a spiral path in the axial direction of the ultra thermo roll.

More advantageously the ultra thermo roll comprises at least three of the above mentioned properties, preferably all the mentioned properties.

The invention also provides for a further method step in the method in the multi-roll calender in which at least one fiber roll is replaced by a resilient-surfaced polymer roll.

The invention also provides for a further method step in the method of upgrading the multi-roll calender comprising following calendering by coating of the web in the coating in a coater in which the coating paste type used is replaced by a coating paste with higher calendering requirements and/or of lower quality.

Advantageously in the method for modernization of the multiroll calender the calender to be modernized is a supercalender and it is modernized to an ultracalender or multiroll calender by replacing at least one existing thermo roll by an ultra calender roll.

According to an advantageous feature of the invention in the method the fiber web is calendered in a multiroll calender comprising at least two calender rolls, advantageously at least six calender rolls, preferably in at least one stack of calender rolls.

By the invention, calendering capacity of a multiroll calender, in particular of a supercalender, is increased. The invention provides for cases where three multiroll calenders would be needed for continuous production modernization such that two with the inventive idea modernized calenders, i.e. ultra calenders, will be enough.

Capacity limitation of calendering is due to the need of mechanical work required for smoothing the surface. Reduced running speed increases calendering effect and on the other hand increased thermal treatment enhances the mechanical work. In supercalenders the mechanical work is also enhanced by the use of filled rolls which produce friction heat in nip process. For the same reason, the lifetime of these rolls is limited and with high speeds they cannot be used at all. The limited lifetime of the rolls forces the maintenance intervals of supercalenders to be short, greatly affecting the capacity of the supercalender. When utilizing the invention with applied heat from thermo rolls the need for filled rolls is eliminated and calender capacity is increased.

Gloss in sheet is created in calendering when the smooth surface of rolls flattens the paper color pigments on sheet surface. Pigments are included in sheet either by filler in stock mix or in a coating layer applied on top of the base sheet. Depending on pigments, they need more of less calendering for reaching the required gloss level. Easily polished pigments are considerably more expensive than pigments requiring more work for polishing. When utilizing the invention, calendering capacity is increased and substantial savings can be reached when the coating pigment cost can be reduced.

It is understood that calender rolls refers to rolls that form the calendering nip, upper roll refers to the uppermost roll in a stack of rolls, upper nip refers to the uppermost calendering nip formed between the upper roll and the calender roll below the upper roll, lower roll refers to the lowest roll in a stack of rolls and lower nip refers to the lowest calendering nip in a stack of rolls, which lowest calendering nip is formed between the lower roll and the calender roll above the lower roll. Intermediate nips refer to calender nips formed by calender rolls between the rolls between the upper nip and the lower nip of a calender. In case of a horizontal calender stack, upper roll and uppermost calendering nip refers to a first nip roll and a first nip of the calendering process and the lower roll and lowest calendering nip refers to the last roll and the last nip of the calendering process. The stack of rolls can be vertical or inclined or horizontal. The calender can comprise one stack of rolls or more than one stack of rolls, for example two stacks of rolls. The stacks of rolls may or may not have a common support frame. By the term ultra thermo roll is meant a calender roll that is a thermo roll that has an extreme combination of properties.

Various embodiments of the invention will be or have only been described in connection with one or some of the examples of the invention. A person skilled in the art will appreciate that any embodiment of the invention may be applied alone or in combination with other embodiments.

BRIEF DESCRIPTION OF THE DRAWINGS

In the following the invention is discussed in more detail by reference to figures of the accompanying drawings.

DESCRIPTION OF THE PREFERRED EMBODIMENTS

In the following description the same reference signs designate respective components unless otherwise mentioned and it should be understood that the examples are susceptible of modification in order to adapt to different usages and conditions within the frames of the multiroll calender.

Figure 1:
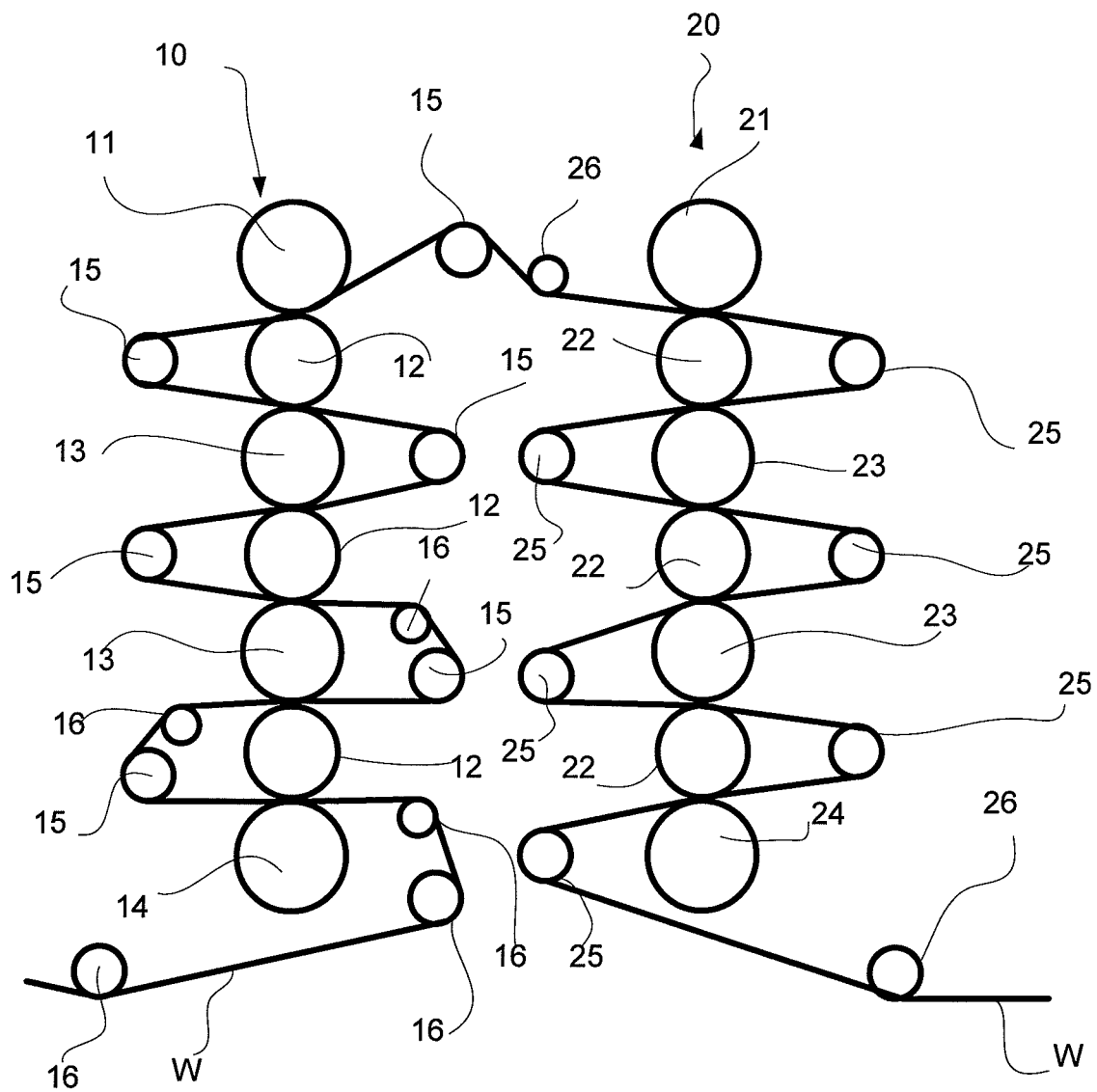
FIG. 1 is a schematic side view showing one example of a multiroll calender.
Figure 2:
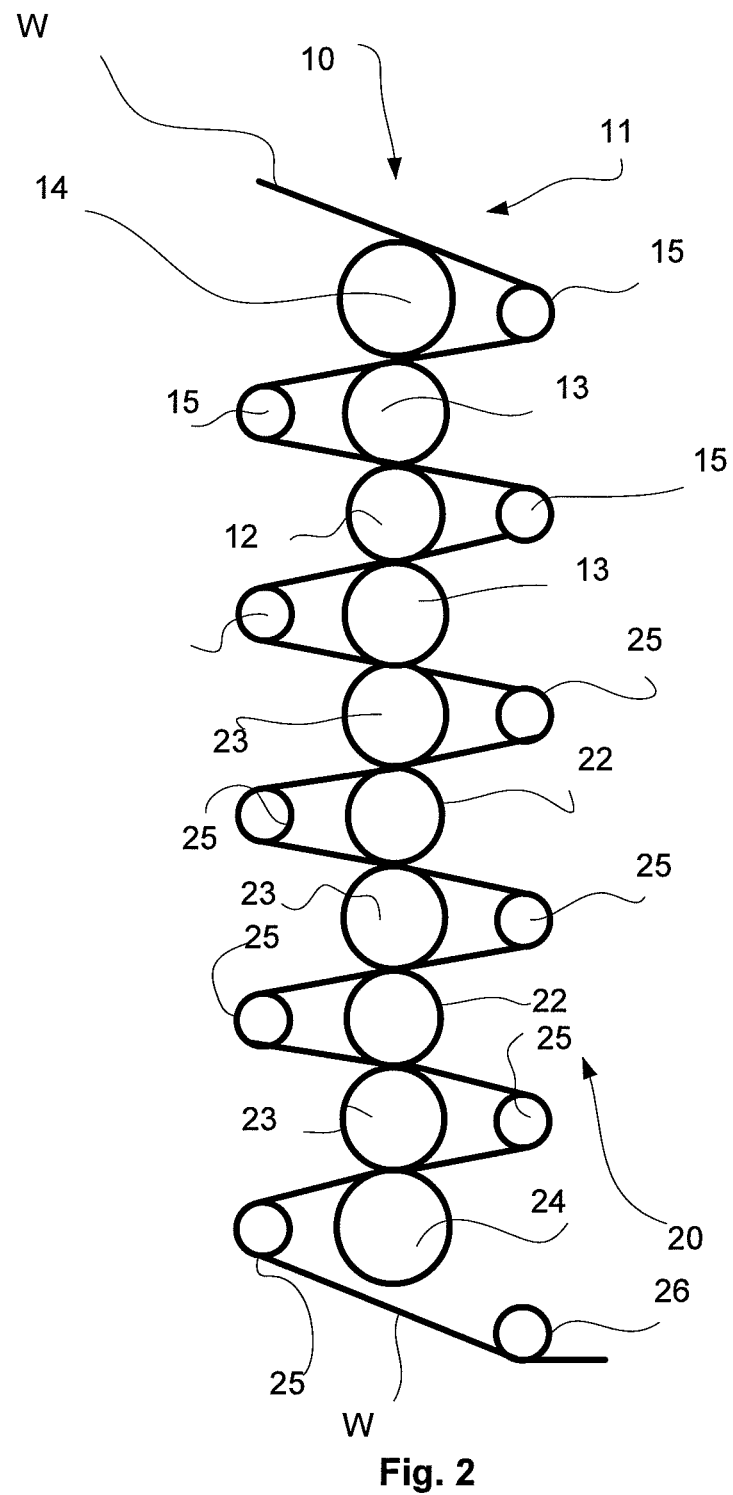
In FIG. 2 is a schematic side view showing one example of a supercalender.

FIGS. 1-2 schematically show examples of multiroll calenders with two stacks of calender rolls. A TwinLine™ type multiroll calender is shown in FIG. 1, and a supercalender type multiroll calender is shown in FIG. 2. The multiroll calender shown in the figures comprises two stacks of calender rolls 10, 20, in which a fiber web W is calendered in the calendering nips between the calender rolls of the stacks of calender rolls. Reference numerals 11-16 refer to those parts and components of first stack 10 of calender rolls and reference numerals 21-26 to those of a second stack 20 of calender rolls. By reference numerals 13, 23 a calender roll that is a resilient-surfaced calender roll is indicated and by reference numerals 12, 22 a calender roll that is a smooth-surfaced calender roll, for example a thermo roll, is indicated. Resilient-surfaced calender rolls 13, 23 are soft-surfaced, for example polymer-surfaced deflection, rolls and smooth-surfaced rolls 12, 22 are metal rolls, or thermo rolls either heatable and/or coolable thermo rolls. Guide rolls guiding the web are indicated by reference numeral 26, fly rolls by reference numeral 25. In FIGS. 1-2 a multiroll calender with two stacks of calender rolls 10, 20 is shown. The two stacks 10, 20 are located next to each other in the example of FIG. 1. The uppers rolls 11, 21 and the lower rolls 14, 24 of each stack 10, 20 are deflection compensated rolls. Rolls 12, 22 are thermo rolls and rolls 13, 23 are resilient-surfaced polymer rolls. In FIG. 2 a multiroll calender with two stacks of calender rolls 10, 20 is shown. The two stacks 10, 20 are located on top of each other. The upper roll 11 is a deflection compensated roll. Rolls 12, 22 are thermo rolls and rolls 13, 23 are resilient-surfaced polymer rolls. Lower roll 14 is a deflection compensated roll. In the examples the calendering nips are formed between a smooth-surfaced press roll 12, 22 such as a metal roll and a roll coated with resilient material such as a polymer roll 13, 23.

According to the invention in modernization of a multiroll calender at least one of the thermo rolls 12, 22 is replaced by the ultra thermo roll with the properties mentioned above.

Figure 3:
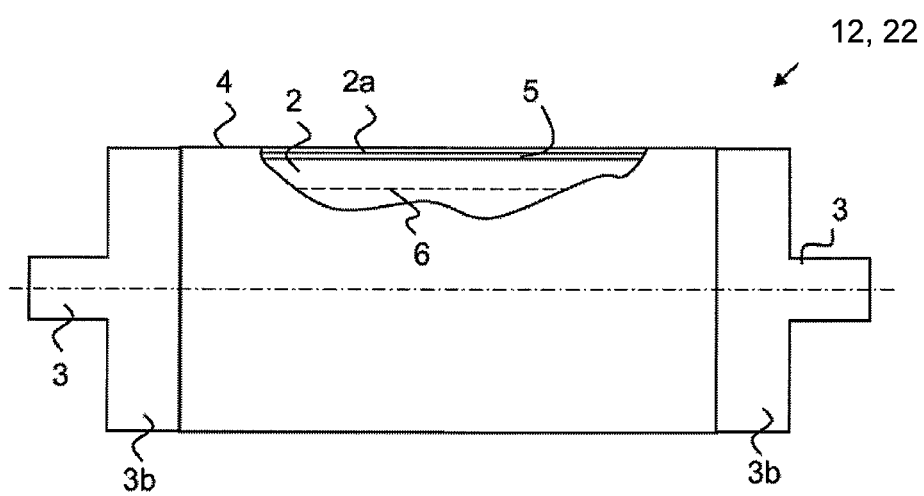
In FIG. 3 is a schematic elevational view showing one example of a thermo roll.

In FIG. 3 an example of a thermo roll is shown. In this example the thermo roll 12, 22 is a heated roll with an outer layer 4, for example of steel, and an inner shaft 2 within the outer layer, having flow grooves on its surface for forming flow channels 5 for a heat transfer medium. The thermo roll comprises an inner shaft 2 and shaft ends 3 fastened to the flange ends 3b of the inner shaft 2 for carrying a load. An inner surface of the inner shaft is indicated in the figures with a dotted line 6. At least one of the shaft ends 3 fastened to the inner shaft 2 comprises at least one flow channel for conducting heat transfer medium in and/or out. The thermo roll preferably comprises a steel outer layer 4 around the inner shaft 2 for transferring heat during operation from the heat transfer medium to a fiber web. The heat transfer medium is preferably oil for use in high temperatures or pressurized water for lower temperatures. The thermo roll comprises flow channels 5 for the heat transfer medium in the connection area of the inner shaft 2 and the outer layer 4. The flow channels 5 may be formed as flow grooves on an outer surface of the inner shaft and on an inner surface 2a of the outer layer 4. The flow channels 5 can also be flow grooves on the inner surface 2a of the outer layer 4 and a corresponding part on the outer layer of the inner shaft 2. The flow channels 5 can further be flow grooves on the surfaces of the inner shaft 2 and the outer layer mutually aligned or shifted in relation to each other in the peripheral direction of the thermo roll. Preferably the flow channels 5 form a continuous flow channel system on the area of the mantle part against which the fiber web is in contact during calendering. The flow channels 5 can be parallel with the axis of the thermo roll, obliquely or in the form of a spiral. The flow channels 5 are preferably located close to the outer surface of the thermo roll and in spiral form. Prior art presents various types of thermo rolls and their designs. In Metso Paper Inc.'s FI patent application 20095284 and WO publication 200977647 are disclosed some examples of thermo rolls that may be configured as ultra thermo rolls with the properties mentioned above.

In the above the invention has been described by way of example with reference to the figures of the accompanying drawing. However many modifications and variations are possible within the inventive idea.

We claim:

1. A method for modernizing a multiroll calender for a fiber web, a paper web, or a board web, the method comprising:
    modifying at least one stack of calender rollers, wherein the stack of calender rolls comprises at least two calender rolls and at least one of the calender rolls is a smooth-surfaced press roll of a selected diameter and maintained at a selected surface temperature with a source of heading fluid of a first selected temperature, by removing the at least one smooth-surfaced press roll and replacing it with an ultra thermo roll having flow channels for the heating fluid, the ultra thermo roll defining an axial direction, and having an outer surface of an outer layer of a mantle part and a roll diameter which is substantially no larger than the selected diameter of the smooth-surfaced press roll which is removed; and
    maintaining a surface temperature of the ultra thermo roll by heating the outer surface with the source of heating fluid at the first selected temperature to at least 110° C.;
    wherein the ultra thermo roll is configured with thermal transfer properties such that the outer surface temperature of the ultra thermo roll is at least 10° C. higher than the selected surface temperature of the smooth-surfaced press roll which has been replaced employing the source of heating fluid with the first selected temperature.

2. The method of claim 1 wherein the step of modifying at least one of an existing stack of calender rolls is performed in a multiroll calender comprising at least two stacks of at least four calender rolls.

3. The method of claim 1 wherein the ultra thermo roll is a thermo roll wherein the mantle part comprises an inner layer and the outer layer is attached to the inner layer and the flow channels for heating fluid comprise at least flow grooves formed on an outer surface of the inner layer.

4. The method of claim 1 wherein in the ultra thermo roll the flow channels for heating fluid comprise at least flow grooves which are less than 45 mm from the outer surface of the outer layer of the mantle part of the ultra thermo roll.

5. The method of claim 1 wherein in the ultra thermo roll the flow channels for the heating fluid comprise flow grooves extending in a spiral path in the axial direction.

6. The method of claim 1 wherein the flow channels comprise at least flow grooves and wherein the surface roughness of the thermo roll is less than 0.20 μm Ra.

7. The method of claim 1 wherein the existing stack of calender rolls includes at least one fiber roll and wherein the step of modifying the existing stack of calender rolls includes replacing the at least one fiber roll by a resilient-surfaced polymer roll.

8. The method of claim 1 wherein vibration excitation is minimized by moving the heating fluid through spiral shaped grooves forming the flow channels.

9. The method of claim 1 wherein vibration excitation is minimized by moving the heating fluid through spiral shaped grooves forming the flow channels; and
    transferring heat from the heating fluid to the outer surface of the mantle part of the ultra thermo roll having a surface roughness of less than 0.20 μm Ra over a distance of less than 45 mm at a rate of at least 800 W/(m$^{2\circ}$ C.).

10. The method of claim 9 wherein the existing stack of calender rolls includes at least one fiber roll which engages the press roll and wherein the step of modifying the existing stack of calender rolls includes replacing the at least one fiber roll by a resilient-surfaced polymer roll which engages the ultra thermo roll.

* * * * *

UNITED STATES PATENT AND TRADEMARK OFFICE
CERTIFICATE OF CORRECTION

PATENT NO. : 9,133,580 B2
APPLICATION NO. : 13/773323
DATED : September 15, 2015
INVENTOR(S) : Jani Hakola et al.

Page 1 of 1

It is certified that error appears in the above-identified patent and that said Letters Patent is hereby corrected as shown below:

In the Claims

Column 7, line 28, "one stack of calender rollers" should be --one stack of calender rolls--.

Column 7, line 33, "source of heading fluid" should be --source of heating fluid--.

Signed and Sealed this
Twenty-ninth Day of March, 2016

Michelle K. Lee
*Director of the United States Patent and Trademark Office*